Oct. 23, 1928.

A. COTTON 1,688,574

SECTIONAL HEADER FOR WATER TUBE BOILERS

Filed April 8, 1922 6 Sheets-Sheet 1

INVENTOR
ALFRED COTTON
BY
Bakewell & Church
ATTORNEY

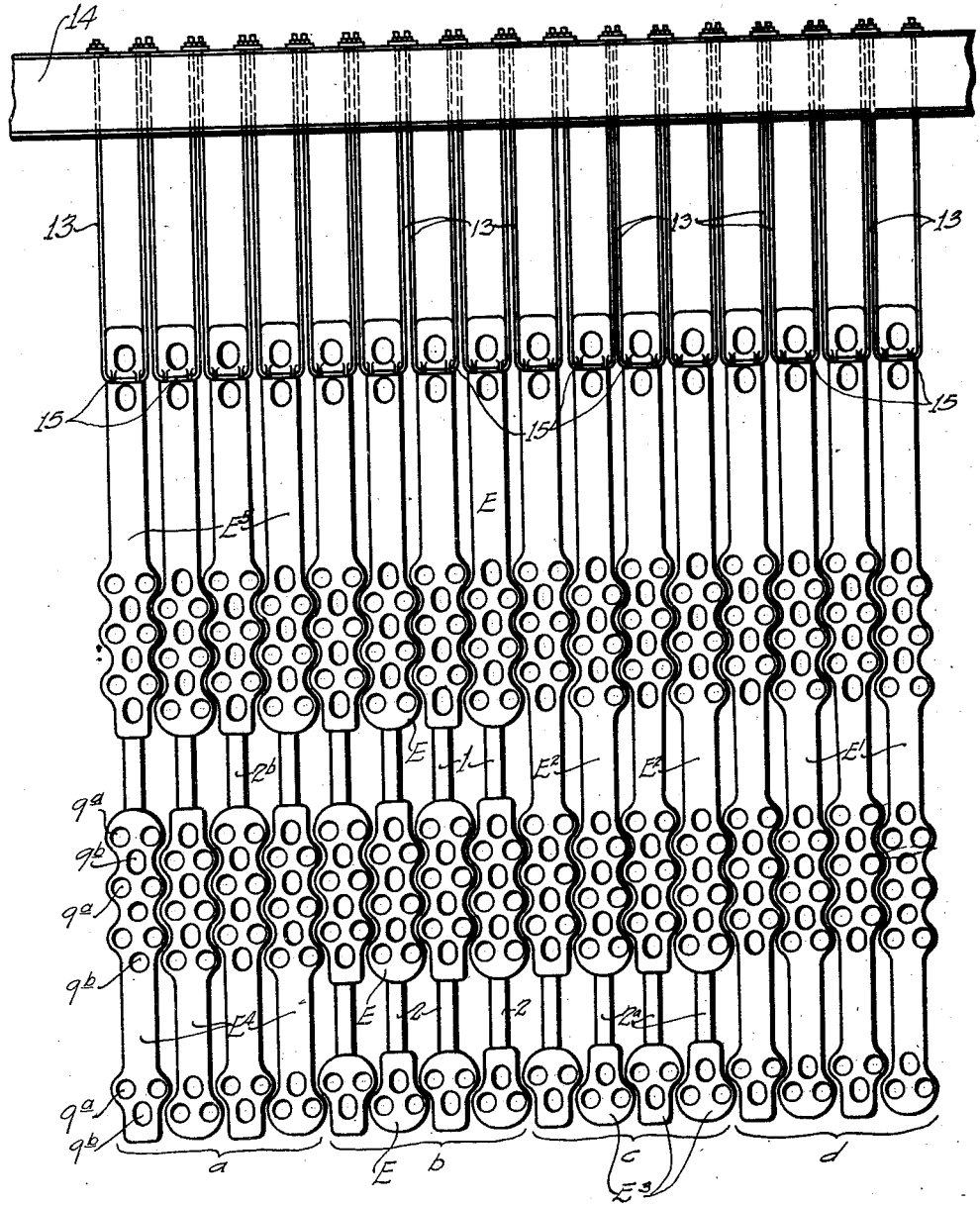

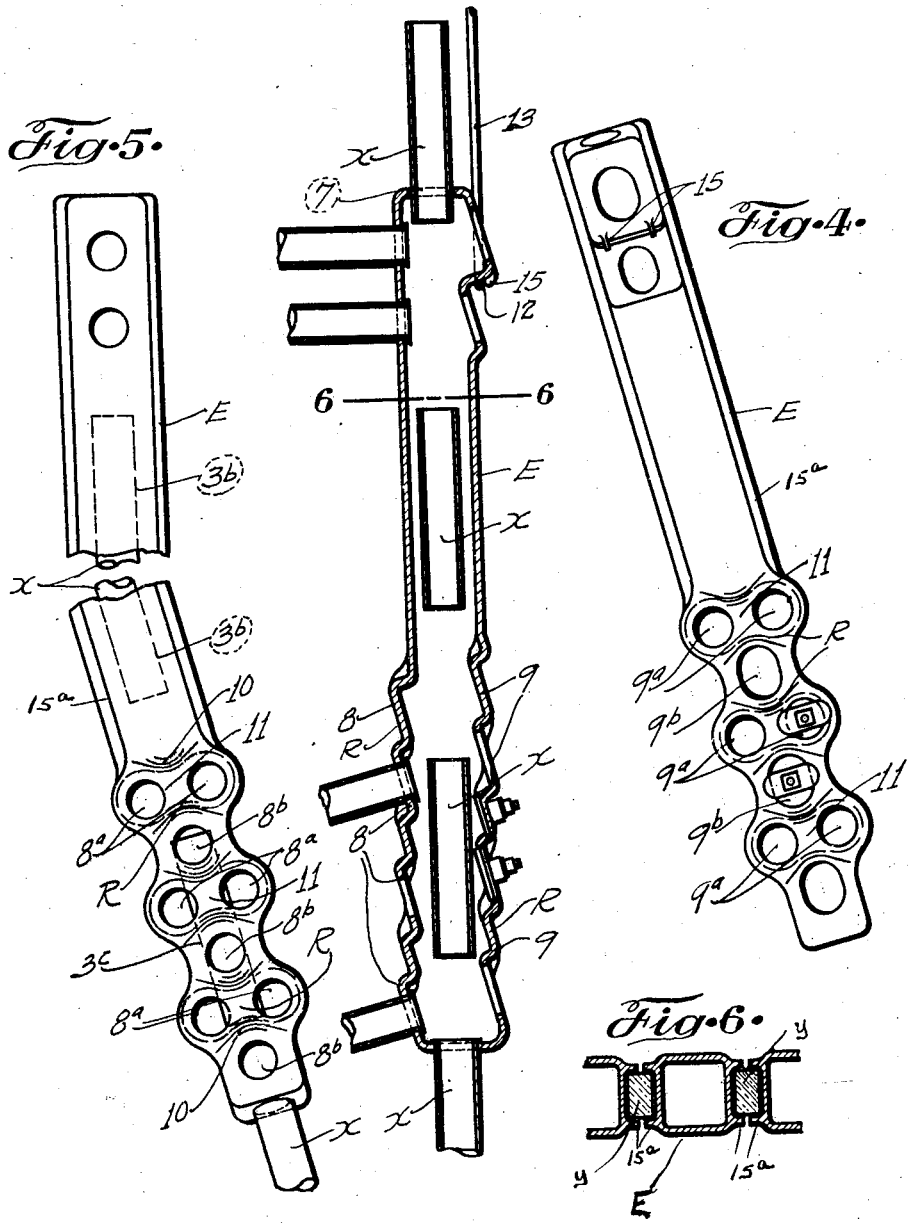

Oct. 23, 1928.
A. COTTON
1,688,574
SECTIONAL HEADER FOR WATER TUBE BOILERS
Filed April 8, 1922      6 Sheets-Sheet 4
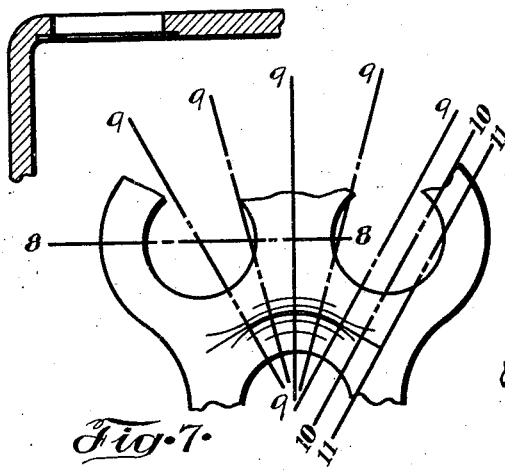
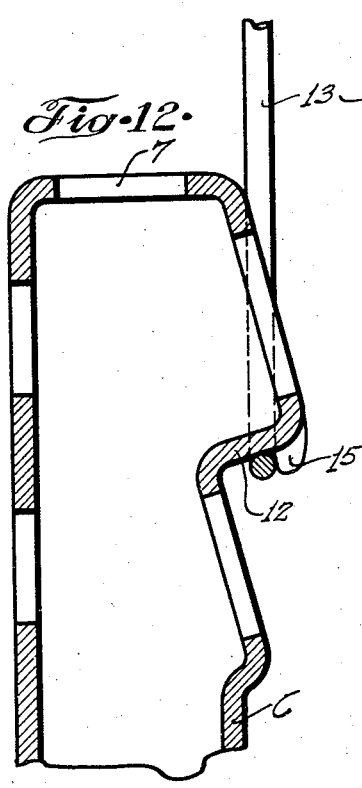
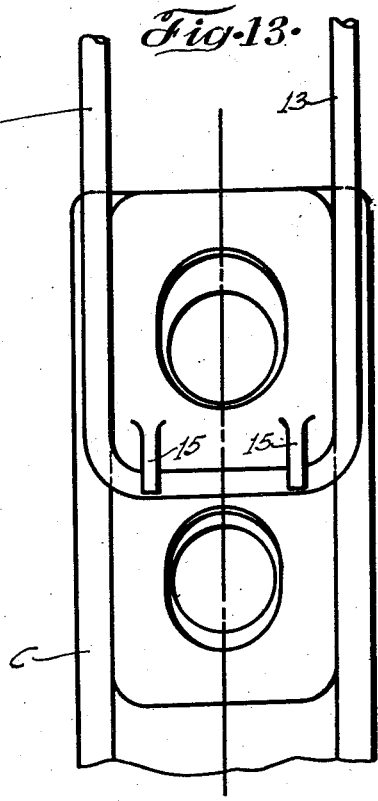
INVENTOR
ALFRED COTTON
BY
ATTORNEY Oct. 23, 1928.
A. COTTON
1,688,574
SECTIONAL HEADER FOR WATER TUBE BOILERS
Filed April 8, 1922  6 Sheets-Sheet 5
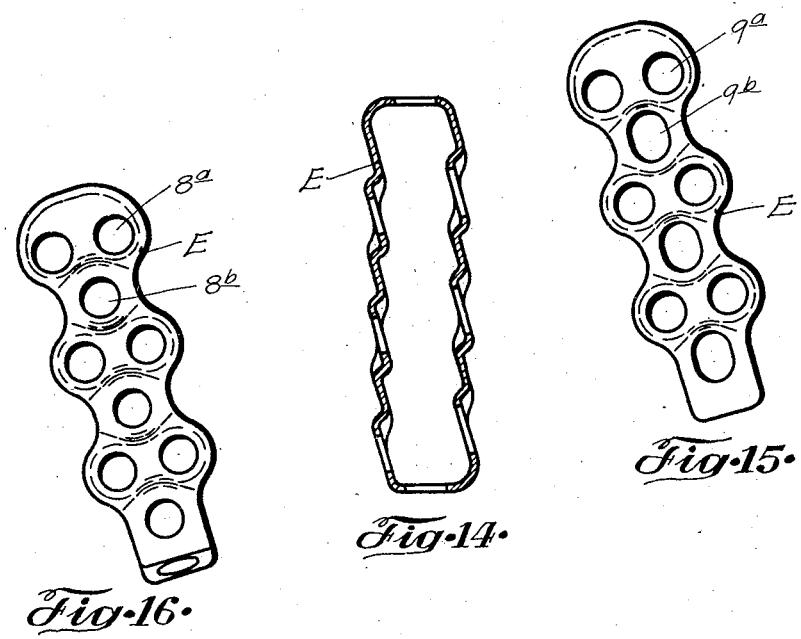
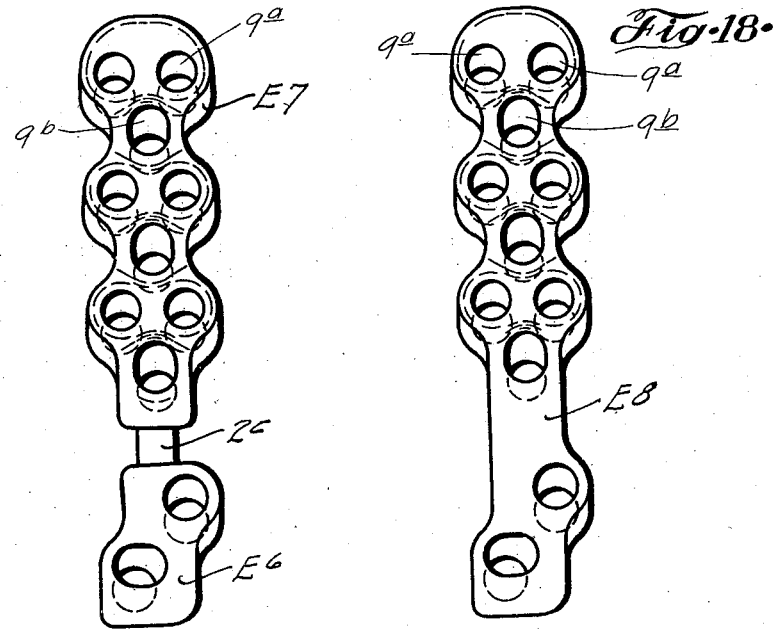
INVENTOR
ALFRED COTTON
BY
Bakewell & Church
ATTORNEY Patented Oct. 23, 1928.

1,688,574

UNITED STATES PATENT OFFICE.

ALFRED COTTON, OF ST. LOUIS, MISSOURI, ASSIGNOR TO HEINE BOILER COMPANY, OF ST. LOUIS, MISSOURI, A CORPORATION OF MISSOURI.

SECTIONAL HEADER FOR WATER-TUBE BOILERS.

Application filed April 8, 1922. Serial No. 550,809.

This invention relates to sectional headers for water tube boilers.

One object is to provide a sectional header which is of such construction that a defective nipple used to join two superimposed headers can be replaced at a fraction of the cost of replacing a nipple arranged between two conventional serpentine headers, and moreover, can be replaced without liability of injuring or destroying the baffles of the boiler.

Another object is to provide a sectional header that is equipped with a novel means for supporting it on a sustaining device suspended from a supporting structure.

Figure 1 of the drawings is a vertical longitudinal sectional view of a water tube boiler equipped with sectional headers constructed in accordance with my invention.

Figure 2 is an elevational view purporting to show various forms of headers constructed in accordance with my invention, used in the same boiler, the section *a* illustrating one form, the section *b* another form, the section *c* another form and the section *d* another form.

Figure 3 is a vertical longitudinal sectional view of a rear header constructed in accordance with my invention, illustrating how a nipple can be passed downwardly through the header and positioned in the lower end of same during the operation of renewing a defective nipple.

Figure 4 is a front elevational view of the header shown in Figure 3.

Figure 5 is a rear elevational view of the header shown in Figure 3.

Figure 6 is a horizontal sectional view, taken on the line 6—6 of Figures 3 and 1.

Figure 7 is an enlarged rear elevational view of a portion of the header shown in Figures 3, 4 and 5.

Figure 8 is a sectional view, taken on the line 8—8 of Figure 7.

Figure 9 is a detail sectional view, taken on any one of the section lines 9—9 of Figure 7.

Figures 10 and 11 are sectional views, taken on the lines 10—10 and 11—11 of Figure 7.

Figure 12 is an enlarged vertical, longitudinal sectional view of the upper end portion of the header shown in Figure 3.

Figure 13 is a front elevational view of the header shown in Figure 12.

Figure 14 is a vertical sectional view, illustrating the middle header of the section —*b*— of Figure 2.

Figures 15 and 16 are a front and a rear elevational view, respectively, of said header.

Figure 19:
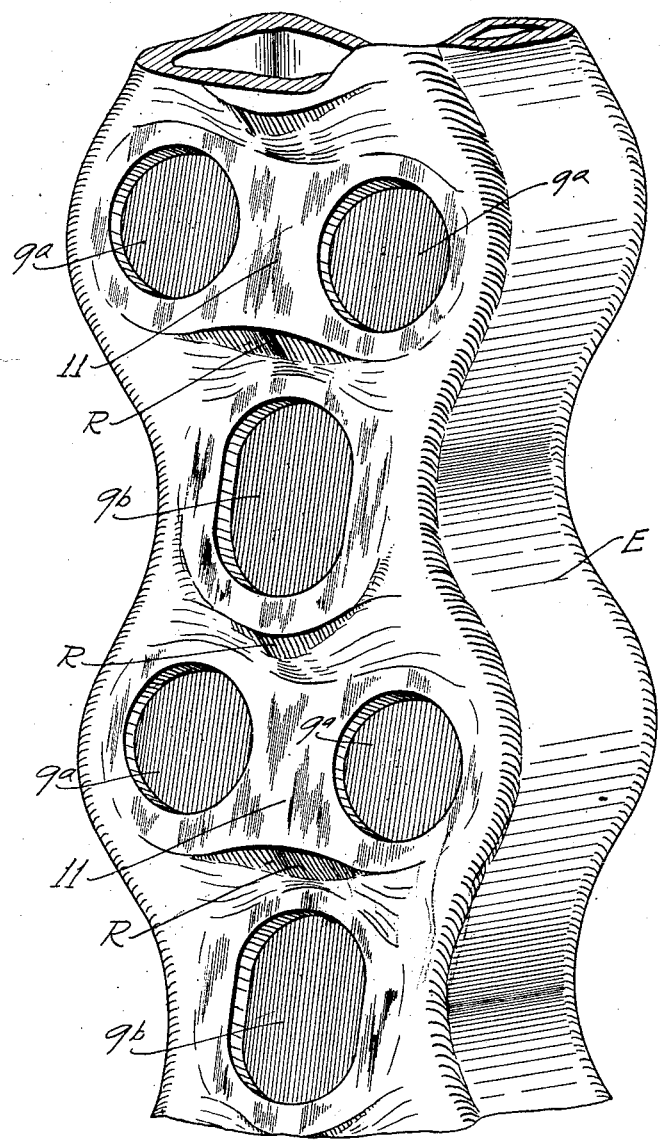

Figures 17 and 18 are front elevational views of other forms of headers embodying my invention; and Figure 19 is a perspective view of a portion of any of the headers previously referred to, illustrating the construction of the reinforcing elements between the hand holes.

The conventional sectional header that is now used almost universally in water tube boilers consists of a hollow, vertically-disposed member of sinuous or serpentine shape provided with one vertical row of staggered water tube holes, the headers that are arranged at one end of the tube bank of a boiler being of identical shape and size so that a plurality of headers can be arranged side by side in nested relation, with their upper ends terminating on the same line and their lower ends terminating on the same line. As each header accommodates only one vertical row of tubes, the complete boiler comprises a relatively great number of headers, the cost of which forms a considerable item in the total cost of the boiler. Moreover, as a conventional serpentine header is too tortuous to permit a nipple to be passed downwardly through the same, considerable trouble and expense is involved in the renewal of a nipple that is used for connecting two superimposed headers. For example, in a boiler equipped with conventional sinuous headers and provided with three tube banks arranged one above the other, the operation of renewing a nipple that is used for connecting a header of the middle bank to the header arranged directly above or below same, consists in first cutting the two upper nipples and the two lower nipples at the opposite ends of the section to which the defective nipple is connected and then bodily shifting the water tubes and headers constituting said section endwise into such a position that the header at one end of the section projects outwardly far enough to permit new nipples to be introduced into the top and bottom of the projecting header and temporarily held in place. The entire section is then moved endwise in the opposite direction so as to cause the other header to project outwardly far enough to permit new nipples to be introduced into the top and bottom of the header and temporarily held in place. The section is then moved back into its original position and the four nipples that were inserted in the top and bottom of the two headers at the opposite ends of the section are then positioned properly and expanded so as to connect the headers to the cooperating headers of the adjacent bank. It will thus be seen that in a boiler equipped with conventional serpentine headers the replacement of one defective nipple necessitates the destruction of three good nipples; it requires four nipples to be expanded and it results in injury to the baffles of the boiler, due, of course, to the fact that the baffles are disturbed and sometimes destroyed when the section is moved endwise in opposite directions so as to permit the new nipples to be inserted in the upper and lower ends of the headers.

The sectional header that forms the subject-matter of my present invention is of such construction that it reduces the number of headers required in a boiler, thus reducing the cost of the boiler, and it is so designed that it permits a defective nipple to be renewed quickly and without liability of injuring or destroying the baffles of the boiler. Briefly described, my improved sectional header consists of a hollow cast member of sufficient width to accommodate more than one vertical row of staggered tubes and of such internal shape that a nipple can be passed downwardly through the same and positioned in the lower end of the header without disturbing the header or moving it relatively to the adjacent headers of the bank of which it forms a part. The header is preferably made wide enough so that it will accommodate one and a half vertical rows of staggered tubes, namely, all of the tubes of one vertical staggered row and every other tube of an adjacent vertical staggered row. To compensate for the additional width of the header and insure that it will be capable of successfully resisting the internal pressure to which it is subjected when in use, I form the front and rear sides of the header in a novel manner that imparts great strength to the header.

Figure 1:
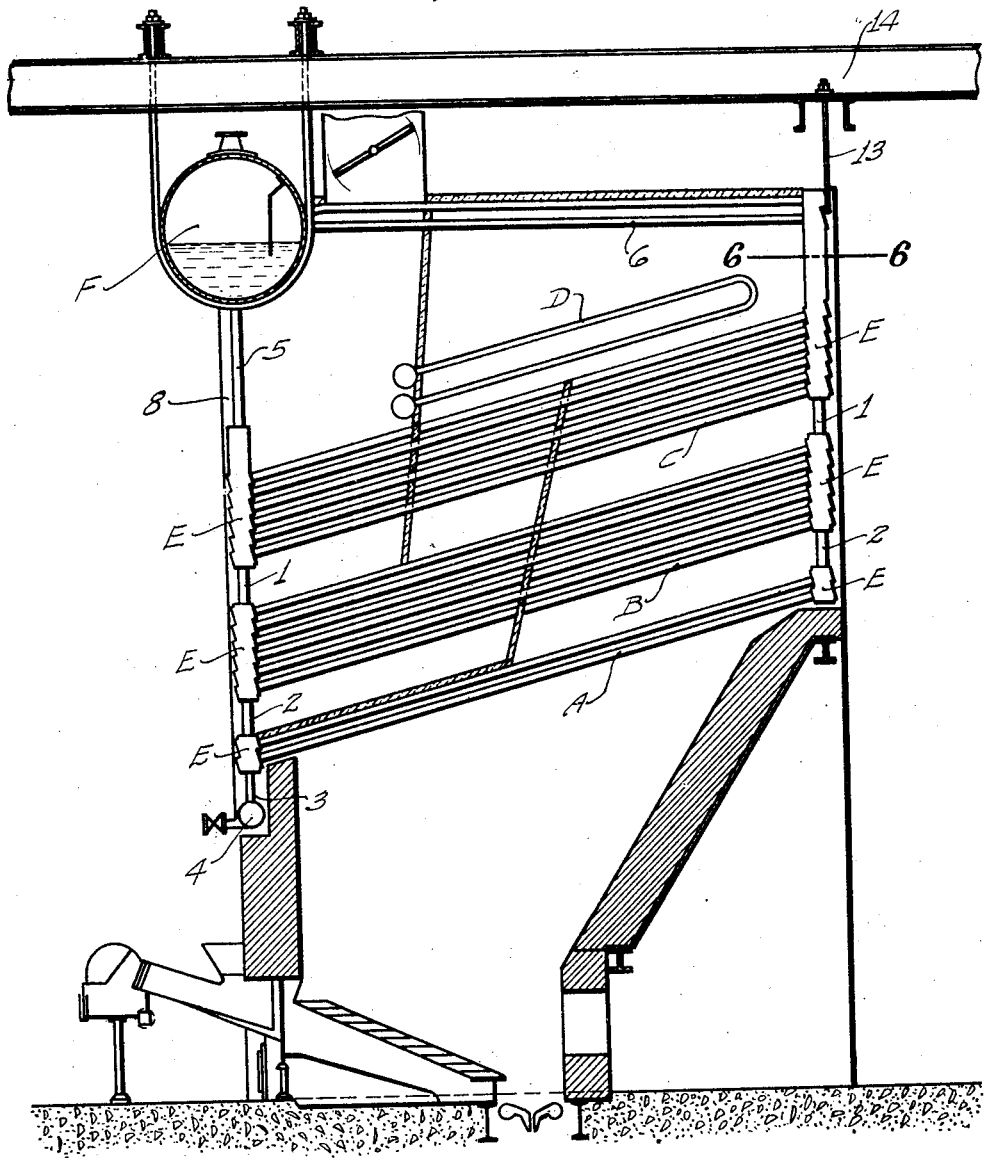

In order that my invention may be clearly understood, I have illustrated in Figure 1 of the drawings a boiler that is equipped with sectional headers constructed in accordance with my invention. Said boiler comprises three banks of water tubes A, B and C spaced apart, a super-heater D arranged either above the upper bank or in one of the spaces between the adjacent banks, sectional headers E arranged at the opposite ends of the banks A, B and C and connected to the tubes of said banks, nipples 1 for connecting the headers of the upper bank to the headers of the middle bank, nipples 2 for connecting the headers of the middle bank to the headers of the lower bank and nipples 3 that connect the front headers of the lower bank to a mud drum 4, the front headers of the upper bank being connected by means of nipples 5 to a transverse steam-and-water drum F, and said steam-and-water drum F being connected by means of circulators 6 with the rear headers of the upper bank. The number of rows of tubes in each of the banks may be varied to suit individual requirements, or all of the water tubes of the boiler may be arranged in one solid bank. The banks may be provided with individual sectional headers E connected together by nipples 1 and 2, as illustrated in Figure 1, or, if desired, the headers of the boiler may be constructed in the manner illustrated in Figure 2, wherein section $d$ illustrates one-piece sectional headers E', each of which is connected to the tubes of the three banks, section $c$ illustrates headers $E^2$ constructed to receive the tubes of the middle bank and the tubes of the upper bank and connected by means of nipples $2^a$ with separate headers $E^3$ connected to the tubes of the lower bank, section $b$ illustrates the headers shown in Figure 1 and section $a$ illustrates headers $E^4$ constructed to receive the tubes of the lower bank and the tubes of the middle bank and headers $E^5$ constructed to receive the tubes of the upper bank and connected to the headers $E^4$ by nipples $2^b$.

There are two important advantages gained by making the header wider than a conventional serpentine header. One is, that the cost of the boiler is reduced, owing to there being a smaller number of headers, and the other is, that it enables the nipples used to connect the headers together to be passed longitudinally through the headers during the operation of renewing a nipple. As previously stated, my improved header is preferably so designed that it contains one and a half vertical rows of staggered tube holes. By constructing the header in this manner I obtain a straight thoroughfare through the middle of the header down through which a nipple can be passed, as illustrated in Figure 3, during the operation of arranging said nipple in position to be expanded into the lower end of the header. Suppose, for example, it is desired to renew one of the nipples 1 at the front end of the boiler shown in Figure 1. The first operation is to cut said nipple and also the nipple 5 directly above the same that joins the steam-and-water drum F to the header to which said nipple 1 was connected. A new nipple 1 is then introduced into the upper end of said header through the opening in same in which the nipple 5 was positioned, and said nipple 1 is then moved downwardly through the header, until it finally reaches the position occupied by the defective nipple before it was removed. A new nipple 5 is then passed through the drum F and positioned in the upper end of said header, and finally, said nipples 1 and 5 are secured in position by expanding the ends of same. In order that the nipples used in connection with the rear headers may be arranged in position in a similar way, each of the rear headers of the upper tube bank C is provided at its upper end with a hole 7, shown in Figure 12, through which a nipple can be inserted and moved downwardly into operative position at the lower end of said header, as indicated by the nipple $x$ in Figure 3, the hand hole plate which is normally arranged over said hole 7 being omitted from Figure 3 so as to show how the nipples are inserted through said hole. By constructing the headers in such a way that a defective nipple can be replaced without changing the position of the headers and without liability of injuring or destroying the baffles, the cost of maintenance of the boiler is considerably reduced. A further advantage which results from the straight thoroughfare through the center of the header is the much lower resistance to the circulatory flow of the water, as water flows much more easily in a straight line than around a series of bends such as are offered by the closely positioned side walls of the conventional sinuous header.

Instead of making the side walls of my improved header sinuous and disposed in such relation to each other that the convolutions of each of the side walls are arranged directly opposite each other and extend in the same direction, I provide my header with corrugated side walls whose corrugations are arranged diametrically opposite each other and extend in opposite directions, as shown in Figures 4 and 5, thus producing a header that is composed of a plurality of wide portions connected by a plurality of narrow portions. Each of the wide portions of the inner wall or rear wall of the header is provided with two tube holes arranged in transverse alignment with each other and each of the narrow portions of said inner wall is provided with a single tube hole. The outer wall or front wall of the header is provided in each of its wide portions with a pair of hand holes arranged in transverse alignment with each other and in each of its narrow portions with a single hand hole, the single hand holes preferably being of oval shape and the pairs of hand holes of circular shape. Owing to the greater width of my improved header, it is advisable to provide means for strengthening the front and rear walls of same so as to avoid the otherwise necessary undue thickening of the metal at these parts, as local thickening is highly objectionable in steel castings, owing to the internal strains which are set up during the cooling of the casting, which strains frequently cause rupture before the casting is cold. Various means may be used for strengthening the inner and outer walls of the header, but I prefer to provide said walls with angularly-disposed, stepped portions in which the tube holes and the hand holes are formed and construct the "risers" or portions lying intermediate said stepped portions in such a way that they serve as transversely-disposed reinforcing elements that strengthen the wide portions of the front and rear walls in which the pairs of holes are formed. As shown in Figure 3, the inner wall of each header is provided with angularly-disposed, stepped portions 8 and the outer wall is provided with angularly-disposed, stepped portions 9, which stepped portions are disposed at an angle to the longitudinal axis of the header and at right angles to the water tubes that are connected to the header. A pair of tube holes $8^a$ is formed in each of the wide stepped portions of the inner wall or rear wall of the header, and a single tube hole $8^b$ is formed in each of the narrow stepped portions, as shown in Figure 5. Each of the wide stepped portions 9 of the front wall or outer wall of the header is provided with a pair of circular hand holes $9^a$ and each of the narrow stepped portions of said wall is provided with a single hand hole $9^b$, preferably of oval shape, as shown in Figure 4. The "risers" or portions of the front and rear walls of the header lying between the stepped portions 8 and 9 of said walls are constructed in such a way as to impart great strength to the header and also permit the tube holes and hand holes to be arranged close together. In the form of my invention herein illustrated the "risers" or portions of the header just referred to are designated by the reference character R and consist of substantially arch-shaped reinforcing elements that extend transversely of the header. Each of said reinforcing elements R is preferably of substantially Z shape in cross section at its center, as shown in Figure 9, and it changes gradually in cross-sectional shape from its center towards its opposite ends, at which points said element flattens out and merges into the wall of which it forms a part, as shown in Figure 19. To state it in another way, the center portion of each reinforcing element R resembles a Z-bar, in that it comprises top and bottom vertically-disposed flanges joined together by a web which is disposed substantially horizontally, as shown in Figure 9. At each side of the center of the reinforcing element this web commences to assume an inclined position, as shown in Figure 10, and as the ends of the reinforcing element are approached, the angle or pitch of said web is increased to such an extent that the end portions of the reinforcing element resemble a Z-bar that has been partially flattened by twisting its web in a direction to turn said web edgewise, as shown in Figure 11. I do not wish to imply that the web of the Z-shaped center portion of the reinforcing element R is disposed absolutely horizontally and that it is essential that said web twists to such an extent that it is disposed vertically at the end portions of the element R, for it is only essential, so far as my invention is concerned, that the cross-sectional shape of the reinforcing element R change sufficiently to destroy the abrupt angles that exist at the center of said element and cause said angles to gradually die away as the ends of said element are approached, thus causing the end portions of the reinforcing element R to merge into the two stepped portions of the wall of the header which said reinforcing element joins together, as shown in Figure 19. The arch-shaped reinforcing elements R are preferably so arranged that each of the wide portions of the front and rear walls of the header will be bounded at its top and bottom by a pair of oppositely-disposed, arch-shaped beams arranged so that the apexes of same project towards each other, each of said beams being mutually supported transversely by the ligament 11 between the pair of holes in the portion of the wall which said beams reinforce, as shown in Figures 4 and 5. As previously stated, the cross section of the middle part of the reinforcing element R is shown clearly in Figure 9, wherein it will be seen that said reinforcing element simulates a Z-bar. If this section were carried into the side walls of the header, the meeting of the several plane surfaces close together would result in a considerable body of metal being localized at one point. This is highly objectionable in steel castings, owing to the internal strains caused by the larger body of metal keeping molten after the thinner parts of regular thickness have frozen, as this causes the larger bodies of metal to be porous to a sufficiently great extent to cause leakage and weakness. Therefore, I provide the front and rear walls of my improved header with transversely-disposed reinforcing elements of varying cross-sectional shape whose end portions flatten out as they approach the corrugated sides of the header, as shown in Figure 19, so that the transition of the abrupt stepped portions in one plane to the gently corrugated sides in the other plane is accomplished without an accumulation of metal at any point. Sectional headers of the design above described, when constructed of cast steel, are entirely free from the imperfections that would occur if the transversely-disposed reinforcing elements R of the header were of Z-shape throughout their entire length. I am aware of the fact that sectional headers have been made wherein the tube seats were at an angle to the general outline of the header, but such tube seats were generally circular and added little or nothing to the strength of the flat surfaces. I am also aware of the fact that headers have been made with stepped surfaces, but such stepped surfaces were uniform across the face of the header and the abruptness of the steps was not diminished towards the sides of the header nor until it merged into the general contour of the sides.

Another feature of my invention consists in the novel way the rear headers of the upper bank are suspended from an overhead supporting structure. The most usual way of suspending such a header is by means of a U-bolt embracing one of the circulators that connects said header to the steam-and-water drum of the boiler,—for example, the circulator 6, shown in Figure 1, the U-bolt being connected to an overhead transverse beam. An objection to this method of suspending a header is that if the circulator has to be renewed the support for the header is temporarily lost and the header has to be supported for the time being in some other way. Another method of supporting a rear header is to provide the upper end of the header with a lug by which it can be connected to a device depending from an overhead supporting structure, but when a header is provided with such a lug it is not feasible, from a manufacturing standpoint, to form a hole in the upper end of the header through which a nipple can be introduced and passed downwardly through the header during the operation of replacing a defective nipple, as previously described. According to my invention, each of the rear headers E of the upper tube bank C of the boiler is provided adjacent its upper end with a transversely-disposed shoulder 12 that is adapted to rest upon the cross piece of a U-bolt 13 which is suspended from an overhead supporting structure 14, the outer wall of the header being provided with lugs 15 that co-operate with the cross piece of said U-bolt to prevent the shoulder 12 on the header from slipping off said bolt. This forms a substantial and safe suspension for the header that does not interfere with the access to the interior of the header and which does not have to be disturbed when a defective tube or nipple has to be renewed. As shown in Figures 12 and 13, the shoulder 12 is arranged between the hand holes in the outer wall of the header that are disposed oppositely to tube holes in the inner wall of the header, but I wish it to be understood that the particular location of said shoulder is immaterial, so far as my broad idea is concerned, so long as said shoulder is disposed in such a way that the header can be suspended from a link or U-bolt without obstructing the hole 7 in the upper end of the header through which the nipples are introduced into the header, as previously described. Another feature of the rear headers E of the upper tube bank which I believe to be novel is the laterally-projecting flanges 15$^a$ on said headers that co-operate with each other to form vertically-disposed pockets for receiving fire brick $y$ that are positioned between the upper end portions of said rear headers E, as shown in Figure 6.

By making the "risers" or reinforcing elements R arch-shaped, curved or substantially V-shaped in general outline, sufficient space is left vertically about the single hand holes $9^b$ in the front wall of the header so that any or all of said hand holes may be made oval. It will be understood that all hand hole plates should be arranged on the inside of the headers so that the internal pressure tends to tighten the hand hole plates. Therefore, it is necessary to provide the header with oval hand holes through which both the circular and oval hand hole plates may be introduced and removed. Since oval hand holes and oval hand hole plates are more expensive to construct than round ones, it is customary to use as few oval hand holes and oval hand hole plates as is possible. My invention makes it possible to equip a sectional header with a relatively great number of circular hand hole plates that can be introduced into and removed from the header through a comparatively few oval hand holes. The particular number of the oval hand holes that the header is equipped with is immaterial, so far as my invention is concerned, but I prefer to provide each of the narrow portions of the front wall of the header with an oval hand hole so as to give access to the adjacent pairs of round hand holes arranged above and below same.

With modern rates of combustion fine ash is deposited on the tubes in a partially vitrified condition. It is difficult to remove such ash, although the removal of same is essential, as it hinders the transfer of heat to the tubes and water and reduces the area of the gas passage. This trouble is mainly confined to the lower bank of the boiler. In order to reduce this trouble to a minimum, I prefer to make the lower bank of the boiler of larger tubes than the tubes in the other banks and space them farther apart. For instance, with $3\frac{1}{2}$ inch tube spaced horizontally an average of $6\frac{2}{3}$ inches on centers in banks B and C, I would use 4 inch tubes in bank A spaced horizontally on 10 inches centers. When the boiler is constructed in this manner headers of the form illustrated in Figures 17 and 18 will be used, Figure 17 illustrating a sectional header $E^6$ for the lower bank provided with two relatively large tube holes and connected by means of a nipple $2^c$ to a header $E^7$ that is provided with smaller holes for receiving the tubes of the middle bank, and Figure 18 illustrating a one-piece header $E^8$ provided in its inner wall with two tube holes of large diameter for receiving large tubes used to form the lower bank and tube holes of smaller diameter for receiving smaller tubes that are used to form the middle bank.

Having thus described my invention, what I claim as new and desire to secure by Letters Patent is:

1. In a water tube boiler, a vertically-disposed sectional header adapted to be connected to an adjacent section by a nipple, said header being provided at its upper end with an opening through which a nipple can be introduced into the header without disconnecting the header from its supporting means, an overhead supporting structure, and means depending from said supporting structure and engaged with parts on said header located below the upper end of same for sustaining said header.

2. A sectional header for water tube boilers consisting of a hollow member provided at its side edges with laterally-projecting portions that are adapted to co-operate with similar projections on an adjacent header to form pockets for receiving fire brick or the like that are arranged between said adjacent headers.

3. A sectional header for water tube boilers consisting of a hollow member provided with tube receiving portions, and laterally-projecting flanges on the side edges of said header located above said tube receiving portions for co-operating with fire brick or the like that are positioned between adjacent headers.

4. In a water tube boiler, vertically-disposed, sectional headers constructed to receive water tubes, laterally-projecting portions on the side edges of the headers, and fire brick or the like positioned between adjacent headers and confined in position by said laterally-projecting portions.

ALFRED COTTON.